United States Patent [19]
Turner

[11] 3,986,160
[45] Oct. 12, 1976

[54] VISUALIZATION BY ULTRASONIC DETECTION

[75] Inventor: William R. Turner, Silver Spring, Md.

[73] Assignee: Automation Industries, Inc., Silver Spring, Md.

[22] Filed: Apr. 10, 1975

[21] Appl. No.: 567,228

[52] U.S. Cl................................. 340/5 MP; 73/67.7; 343/5 CD
[51] Int. Cl.².......................................... G01S 9/66
[58] Field of Search.......................... 340/3 C, 5 MP; 343/5 CD; 73/67.5 R, 67.5 H, 67.6, 67.7, 67.8 R, 67.8 S

[56] References Cited
UNITED STATES PATENTS

| | | | |
|---|---|---|---|
| 3,587,298 | 6/1971 | Jacobs | 340/5 MP |
| 3,614,720 | 10/1971 | Ludlum | 340/3 C |
| 3,918,025 | 11/1975 | Koshikawa et al. | 340/5 MP |

*Primary Examiner*—Richard A. Farley
*Attorney, Agent, or Firm*—Jones, Tullar & Cooper

[57] ABSTRACT

A system for sensing by ultrasonic vibrational energy the shape and character of objects immersed in a visually opaque transmission medium is disclosed. Frequency modulated ultrasonic waves are projected to irradiate an object, with reflected energy from scattering points on the object being imaged on an ultrasonic image camera. The camera converts the received ultrasonic image to an electronic image which is electronically scanned to produce an output video signal having an amplitude and frequency which is a linear representation of the point-by-point interrogation of the image. The video signal is fed in parallel to an amplitude modulation detector, which produces a linear signal representing the video signal envelope, and a frequency modulation detector, which produces a constant amplitude reproduction of the original modulation signal, except for shifts in phase in accordance with the time delays of reflected ultrasonic signals reaching successive image points on the camera. The outputs of the detectors are processed and the resulting modified video signal and phase angle signal are applied to a visual display such as a cathode ray tube to provide a reconstituted presentation of the depth dimension of the object.

20 Claims, 10 Drawing Figures

VISUALIZATION BY ULTRASONIC DETECTION

BACKGROUND OF THE INVENTION

The present invention relates, in general, to ultrasonic visualization of a target, and more particularly to the use of ultrasonic vibrational energy to sense and display the shape and character of a target immersed in a transmission medium such as, for example, a medium which is opaque to light.

Ultrasonic visualization of objects is a well-known technique for investigating objects such as opaque materials containing defects, for internal investigation of the human body as an aid to medical diagnosis, and the like. One of the most important areas of use for such systems has been in the detection and recognition of objects located in turbid water such as the ocean, which is opaque to light because of suspended particulate material. When such particles are comparable to or larger in size than the wavelengths of visible light, the resulting scattering and absorbing of light waves blocks direct vision of the object.

Because of its much longer wavelength, ultrasonic energy is not blocked by small particles, and thus can penetrate turbid water. The ratio of the length of ultrasonic waves to the length of light waves is on the order of 3000 to 1, and as a consequence particles that will block light will have only a minute effect on the transmission of sound waves. This is in accordance with Rayleigh's law of scattering, which states in essence that for particles small in comparison to wavelength the scattering varies as the sixth power of particle radius. Although the present invention will be described in terms of the detection and visualization of objects in water, the basic principles described herein apply equally to other applications of ultrasonics.

The art of ultrasonic visualization is well developed, and sophisticated sonar systems exist that are capable of detecting distant targets, using ultrasonic carrier modulation to sense depth of field and using various forms of scanning to generate two-dimensional representations of objects. However, two major problems with such systems remain unsolved. The first is object detection with an acceptable level of recognition, for the longer wavelengths of ultrasonic signals adversely affect the ability to recognize visually an object that is detected ultrasonically and displayed wholly on the basis of the amplitude of the reflected energy. This problem is caused by the fact that a degree of surface roughness on an object sufficient to produce a diffuse reflection for light will appear wholly specular at ultrasonic frequencies, reflecting energy with little diffusion and thus obscuring surface details required for visual recognition. Thus, the visual reproduction derived from an ultrasonic amplitude image does not have the visualization "clues" normally utilized in identifying objects by direct visual observation, these clues being the shading provided by diffuse reflection that reveals object shape. Further, the amplitude image is often confused by wave interference patterns which have no relation to object shape, but which produce interference peaks and valleys which distort return image.

The second major problem in prior art ultrasonic systems is the provision of a "real time" image of the object. Many prior art systems rely on the use of a storage display arrangement to accomodate the time delays involved in receiving signals reflected from various parts of the target, so that the displayed image is a delayed representation of the object. This type of display presents considerable difficulty in situations where an operator is controlling apparatus by means of the displayed image, and where a rapid feedback of information is required if accurate control is to be maintained.

SUMMARY OF THE INVENTION

It is accordingly an object of the present invention to overcome the foregoing and other related difficulties experienced with prior art ultrasonic systems through the provision of a system for determining the depth dimension, or shape, of an object on a real time basis by means of reflected signals other than the usual amplitude signals.

It is another object of the invention to provide an improved ultrasonic visualization system wherein non-image related variations in the amplitude of returned signals are reduced in order to reduce their importance in the total characterization of the object.

It is another object of the present invention to provide a system for ultrasonic visualization of an object through an ultrasonic lens which performs time delay and image point summing functions on a continuous, or analog, basis without sampling noise and hence with a wide dynamic range to provide an improved level of object recognition.

A further object of the invention is the detection of an object through the use of a linear, electronically scanned image converter of wider dynamic range by which ultrasonic wave energy reflected from an object is received and converted to corresponding electrical signals, and wherein the sampling rate is limited only by the response of the processing circuitry, and not by the response rate of mechanical scanners and the like.

Another object of the invention is the provision of an ultrasonic system having a visual display that reconstitutes the depth dimension of a target to provide visualization information normally lost in ultrasonic systems.

In accordance with the present system, a frequency-modulated source of ultrasonic signals projects an ultrasonic beam which irradiates a target object, with the object returning energy in a pattern corresponding to its shape and characteristics to image points on an ultrasonic image camera of the type disclosed in U.S. Pat. Nos. 2,903,617 and 3,577,171 of William R. Turner, among others. The camera produces a beam which scans the image points and produces an output video signal having at any instant an amplitude and frequency corresponding to the point on the ultrasonic image being scanned at that instant. This video signal is then processed in an amplitude modulation (AM) detector and in a frequency modulation (FM) detector, with the output of the AM detector being fed through a transfer control network to reduce the extraneous amplitude fluctuations which are characteristic of ultrasonic images and thus to produce a modified video signal. The output of the FM detector is fed to a phase angle detector which compares the received modulation signal to a reference modulation signal from the ultrasonic signal source and generates sine and cosine functions of the phase angle between the received and reference signals.

The modified video signal and the sine and cosine functions are fed to a display modulator which combines these signals to produce a display signal which, when applied to a visual display device such as a cathode ray tube provides a reconstituted presentation of the shape of the target object.

In general, the use of phase angle detection in an ultrasonic system is known, for example in U.S. Pat. No. 3,587,298. In this patent, an ultrasonic testing system is disclosed wherein ultrasonic phase changes over an image are directly detected and are used to control the color hue of a visual display. This system produces a high visual detecting sensitivity for changes in propagation velocity through various transmission paths in a specimen, so that discontinuities within the specimen and between the specimen and the surrounding medium are clearly delineated in the display. A distinctly different hue is produced for each different ultrasonic phase delay until the phase angle has shifted through 360°; then the color hues repeat. However, this repetition occurs each time the path length through a constant velocity medium changes by one wavelength, and as the range of path length variations in wavelengths increases, color fringes are at first formed in the display, and then even the fringe detail is lost in a blur of color. This blurring would be the result if the system of the prior art were used for underwater object visualization, since the depth dimensions for most objects of interest in underwater applications can be thousands of wavelengths at typical ultrasonic frequencies. The present system, on the other hand, permits object visualization in underwater environments through the utilization of a frequency modulated ultrasonic signal, the determination of phase changes over various signal path lengths at much lower frequencies and hence longer wavelengths than was possible in prior systems, and the conversion of these phase changes into display modulation signals that reveal the object depth dimension.

BRIEF DESCRIPTION OF THE DRAWINGS

The foregoing and additional objects, features, and advantages of the present invention will become more apparent from a consideration of the following detailed description of preferred embodiments thereof, taken in conjunction with the following drawings, in which.

DESCRIPTION OF PREFERRED EMBODIMENTS

Figure 1:
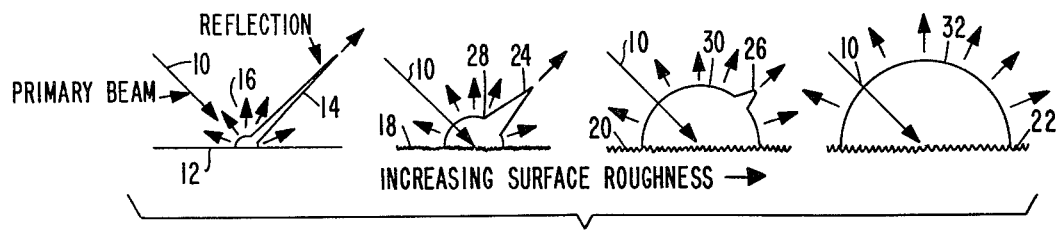
FIG. 1 is a diagrammatic illustration of the nature of wave reflection from various surfaces.

Turning now to a more detailed consideration of the invention, reference is made to FIG. 1 which illustrates the manner in which wave energy, in the form of a primary incident beam 10, is reflected from surfaces of varying degrees of roughness. For mirror-like surfaces such as the surface 12 the incident beam 10 is reflected specularly at an angle, as indicated by the reflective beam 14. Any imperfections in the surface, such as scratches, will scatter a portion of the incident energy to other angles, as indicated by the diffused energy 16. As the roughness of the surface increases with respect to the wavelength of the incident energy, a greater part of the energy in the incident beam 10 will be scattered, and less will be specularly reflected. Thus, the surfaces 18, 20 and 22 illustrated in FIG. 1 are of increasing roughness, and as diagrammatically illustrated the specularly reflected portion decreases, as at 24 and 26 for surfaces 18 and 20, respectively, until the roughness reaches the point where all incident energy is scattered, as from surface 22. For each of the increasingly rough surfaces 18, 20 and 22, then, the proportion of diffused energy increases, as illustrated at 28, 30 and 32, respectively, until all of the incident energy is diffusely reradiated.

The illustrations of FIG. 1 assume that the incident beam 10 has the same frequency, or wavelength, for each of the surfaces. However, it is equally true that a variation in the frequency of a beam incident on a given surface will produce a corresponding variation in the proportion of reflected and diffused energy that is reradiated, with the amount of diffusion increasing as the wavelength approaches the size of the surface imperfections. Because of this characteristic of wave energy, ultrasonic energy can penetrate a transmission medium that is opaque to visible light. But it is this same characteristic that adversely affects the visual ability to recognize an object that is detected by means of ultrasonic energy and displayed solely on the basis of the amplitude of reflected energy, for the surface roughness on an object that produces a diffuse reflection for light waves will appear wholly specular to the much longer wavelengths of ultrasonic frequencies.

In FIG. 1, the response of underwater objects to ultrasonic waves may be that shown by beams 10 and 14, while the response of the same object to visible light may be that shown by beams 10 and 32; i.e., the shorter light waves may be totally diffused by surface imperfections that have substantially no effect on ultrasonic waves. It should also be noted that the energy scattered from surface imperfections may, in the case of ultrasonics, be augmented by the reradiation of energy that enters the object and reverberates within it. Such reradiation provides peaks and valleys in the profile of the diffusely scattered energy, producing additional problems in visualization of the object.

Figure 2:
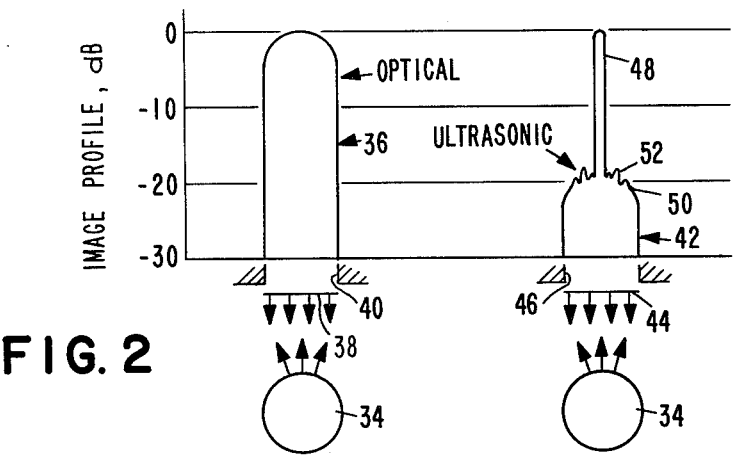
FIG. 2 is a diagrammatic illustration of the differences between optical and ultrasonic visualization of an object.

The critical differences between the effects of a surface on light and ultrasonic radiation is illustrated in FIG. 2, where the two types of wave energy illuminate a solid spherical object 34 which for light is both an opaque and a diffuse scatterer, but which for ultrasonic energy is a slightly transparent, relatively specular scatterer. To obtain the optical profile 36, light is projected from source 38 onto the surface of sphere 34, and the profile of the intensity, or amplitude, of the light imaged back to aperture 40 measured. The resulting optical image profile 36 is a curve which varies as the cosine of the angle between the surface normal of sphere 34 and the observation direction, and the human eye senses this profile as a sphere.

The ultrasonic profile 42 is obtained by irradiating the sphere 34 from a source 44 of ultrasonic wave energy and measuring the amplitude of the wave energy imaged to aperture 46. The resulting energy profile 42 differs considerably from the optical profile. As shown, specular reflection from the surface of the sphere raises an intense peak 48, and the cross section of this peak is determined by diffraction at the imaging device (not shown) rather than by the reflection itself. The amplitude of diffuse scatter 50 will be a function of both the character and depth of surface imperfections. Since reradiation from the surface and from reverberation within the sphere 34 will be superimposed, and since the initial ultrasonic energy from source 44 is normally highly coherent, interference will occur between the reflected and reverberated waves, producing reradiation peaks 52 which depend upon the refractive index of the sphere material.

As may be seen from a comparison of profiles 36 and 42, the observer of a visual reproduction derived from the ultrasonic amplitude image is deprived of the clues normally utilized in identifying the shape of objects by direct visual observation. Further, the ultrasonic image is further confused by wave interference between the low level components of diffuse scattering and reverberation reradiation, with the latter having no relation to the shape of the surface of the object.

The technical literature describes a number of visualization techniques that have been developed to provide accurate visual displays of the ultrasonic image of an object. These techniques can be broadly classified in two categories: (a) square-law systems and (b) linear systems. Typical of the first category are systems in which the conversion from an ultrasonic wave pattern to an optical field depends upon ultrasonic radiation pressure to deform a surface boundary, wherein the deformation may be converted to an optical pattern corresponding to the ultrasonic pattern. However, such systems are essentially wave intensity responsive, and frequency and phase parameters are lost. Systems of the second category typically employ piezoelectric-type materials which convert the ultrasonic pressure to an electrical current or potential. This type of system preserves frequency and phase parameters of the incoming wave, permitting derivation of varying time delays and thereby permitting depth, or shape detection of objects. Only in a linear system can these time delays be derived from frequency modulation applied to the ultrasonic signal. The manner in which the present invention provides depth detection is generally illustrated in FIG. 3, to which reference is now made.

The components of a typical ultrasonic visualization system include an ultrasonic projector 54 which radiates an ultrasonic beam 56 through a transmission medium such as water, irradiating an object 58 within the medium. Reflections from typical scattering points 60$a$ and 60$b$ are focused by ultrasonic lens 64 onto image points 61$a$ and 61$b$ at the face of an ultrasonic camera 66.

Figure 3:
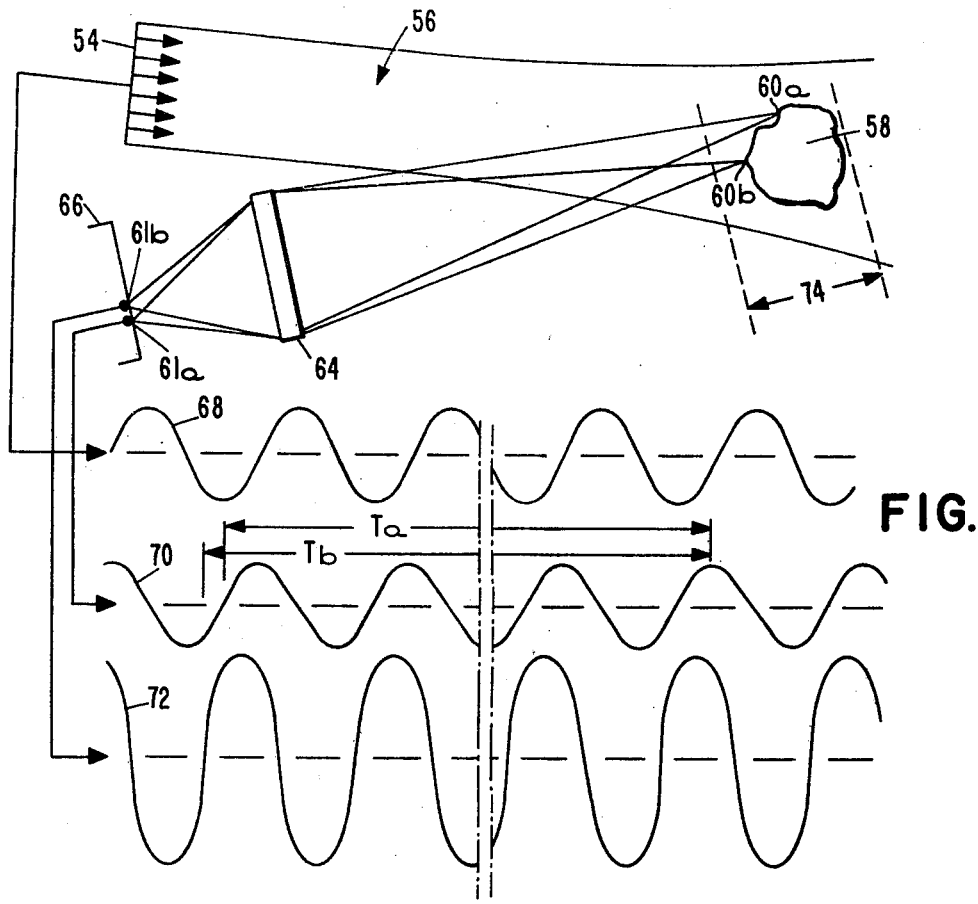
FIG. 3 is a diagrammatic illustration of the ultrasonic visualization technique used in the present invention.

The radiated ultrasonic signal is indicated by waveform 68 in FIG. 3, the waveform depicting, on a reduced scale, either the amplitude of the ultrasonic signal itself or, preferably, the amplitude of the modulation signal applied to the ultrasonic signal as frequency modulation. The signal received at the image point 61$a$ from scattering point 60$a$ is depicted by waveform 70, while the signal received at image point 61$b$ from scattering point 60$b$ is depicted by waveform 72.

At a specific instant of time, a point $p$ of the projector wave 68 will have reached image point 61$a$ in $T_a$ time, and image point 61$b$ in $T_b$ time. The respective distances travelled will be, $$L_1 = c\, T_a, \qquad (1a)$$

and $$L_b = c\, T_b, \qquad (1b)$$

where $c$ is the propagation velocity in the transmission medium. The difference in depth for scattering points 60$a$ and 60$b$ is, $$\delta L = c\,(T_b - T_a)/2, \qquad (2)$$

where the divisor, 2, enters by reason of the folded path between the projector and the camera.

The measurable quantities at the camera 66 are the phase angles at image points 61$a$ and 61$b$, each in relation to the instantaneous phase angle at the projector 54 for the moment of measurement. For each image point, these are, $$\theta_a = 2\pi\,(T_a f - k_a), \qquad (3a)$$

and $$\theta_b = 2\pi(T_b f - k_b), \qquad (3b)$$

where $f$ is the wave frequency, and $k_a$ or $k_b$ are the integral number of wavelengths over the total path. The difference in depth for scattering points $a$ and $b$, in terms of phase angles, is, $$\delta L = c\,[(\theta_b - \theta_a)/2\pi + (k_b - k_a)]/2f, \qquad (4)$$

which is uniquely resolvable only if $(k_b - k_a)$ is zero. This requires not only that the distance in depth between scattering points $a$ and $b$ must be less than one half wavelength, but also that the focal depth indicated at 74 in FIG. 3 for the ultrasonic lens 64 be less than one half wavelength. Under these circumstances, $$\delta L = c[(\theta_b - \theta_p)_1 - (\theta_a - \theta_p)_2]/4\pi f \qquad (5)$$

where $(\theta_b - \theta_p)_1$ and $(\theta_a - \theta_p)_2$ are the phase angle differences between each image point signal and the projector signal at the instants of sequential measurement.

It is this half-wavelength limit that prevents prior systems utilizing ultrasonic frequencies from use in underwater visualization. For example, if an ultrasonic frequency of the order of 3.58 MHz is used, as proposed in the system of U.S. Pat. No. 3,587,298 discussed above, the corresponding half wavelength in water is 0.42 mm, which is minute compared to typical underwater objects. The use of a modulation frequency in the present system permits depth detection of dimensions of typical objects.

Figure 4:
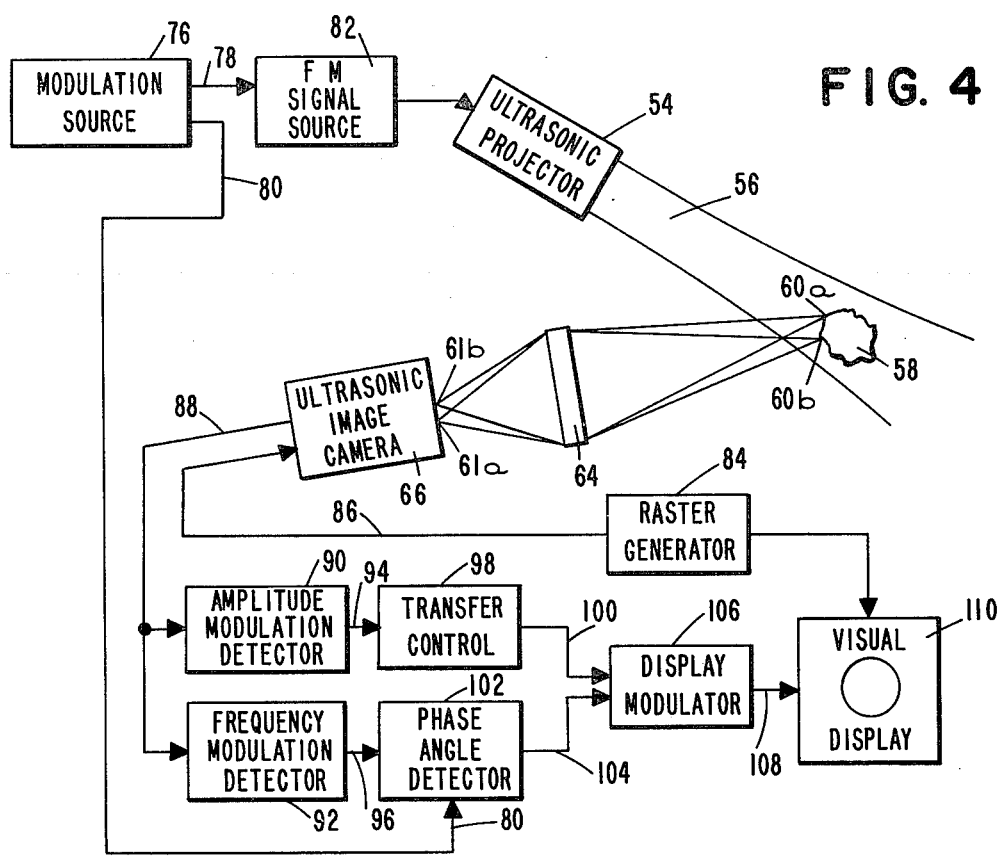
FIG. 4 is a block diagram of the basic signal processing system utilized in the present invention.

A block diagram of the basic signal processing system of the present invention is illustrated in FIG. 4, where a modulation source 76 provides a low frequency sinusoid of high spectral purity as a modulation signal on line 78, and a two phase reference signal on line 80. The modulation signal on line 78 drives an FM signal source 82 which in turn powers the ultrasonic projector 54, previously described with respect to FIG. 3. The projector 54 produces the ultrasonic beam 56 which irradiates the object 58 to be visualized, with the various scattering points, such as points 60a and 60b, returning the beam by way of lens 64 to corresponding image points, such as points 61a and 61b, at the ultrasonic image camera 66.

Camera 66 has means for converting the ultrasonic image focused by the lens into an electronic image that can be scanned electronically and converted into a video signal in accordance with principles already enunciated in U.S. Pat. Nos. 2,903,617 and 3,577,171, among others. This video signal is either at the frequency of the ultrasonic signal, or translated in frequency to an intermediate band. In either case, the amplitude and the relative frequency are linear reproductions of the point-by-point interrogation of the ultrasonic image focussed in the camera 66 by lens 64. Deflection of the scanning beam in the camera 66 is produced by a raster signal produced by generator 84 and applied by way of line 86 to the deflection circuits of the camera.

The video signal produced in the camera 66 is fed by way of line 88 in parallel to an amplitude modulation detector 90 and a frequency modulation detector 92. The amplitude modulation detector rectifies the video signal, producing a linear video signal on line 94 which is a direct reproduction of the video signal envelope. The frequency modulation detector, on the other hand, contains amplitude limiters that suppress the amplitude modulation and contains frequency sensitive circuits that detect the frequency deviation of the video signal, producing on line 96 a modulation signal which is a constant amplitude reproduction of the original modulation signal on line 78, except for shifts in phase in accordance with the time delays of successive image points as the image points are scanned in the camera.

Two further steps of processing prepare the image information for display. A transfer control network 98 reduces the extraneous amplitude fluctuations that are characteristic of ultrasonic images, producing a modified video signal on line 100, while a phase angle detector 102 compares the modulation signal from line 96 to the modulation source reference signal on line 80 and generates on output line 104 a phase angle signal as sine and cosine functions of the angle between the signals on lines 96 and 80.

Finally, a display modulator 106 combines the modified video signal on line 100 and the phase angle signal on line 104 to produce a display signal on line 108 which when applied to a visual display unit 110 provides a "reconstituted" presentation in which the depth dimension of the object is derived from the phase angle signal.

Figure 5:
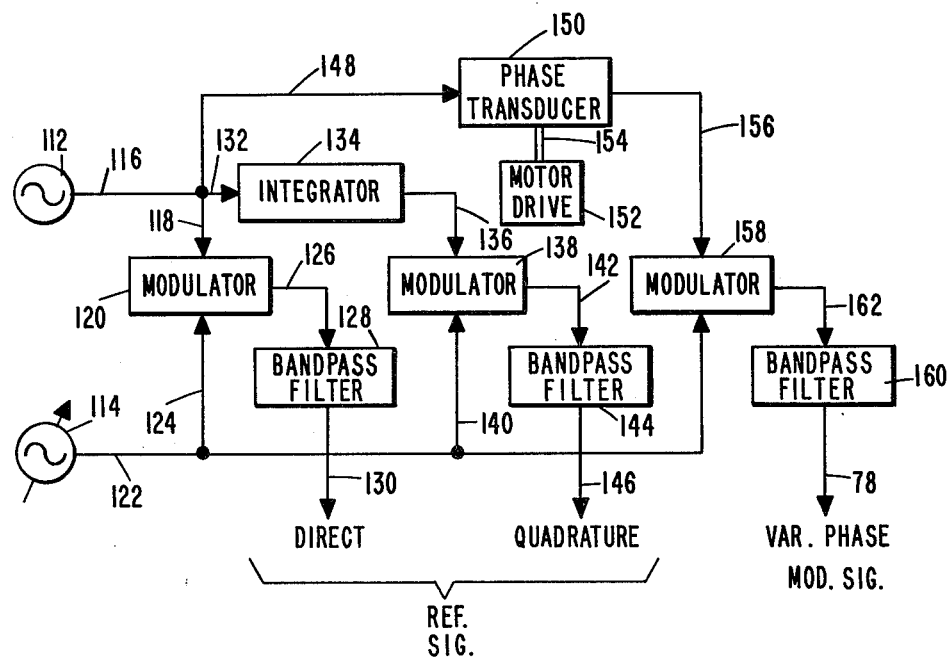
FIG. 5 is a detailed block diagram of a modulation source usable in the system of FIG. 4.

Considering now the system outlined with respect to FIG. 4 in more detail, reference is made to FIG. 5. This Figure shows a preferred form of the modulation source 76 which must produce the low frequency sinusoidal signal on line 78 as a modulation signal, and the two-phase reference signal on line 80. In the first embodiment of the visual display unit to be described, it is necessary for the phase of the modulation signal on line 78 to be continuously variable with respect to the reference signal on line 80, and accordingly this feature is also included in the FIG. 5 circuit.

Modulation source 76 includes a fixed frequency oscillator 112 and an adjustable, variable-frequency oscillator 114 which may be of conventional construction but which must have highly stable amplitudes and frequencies, as well as low distortion. Typically these will be quartz crystal controlled oscillators.

The output from oscillator 112 is applied by way of lines 116 and 118 to one input of a modulator 120; the output from oscillator 114 is applied by way of lines 122 and 124 to a second input of the modulator 120. The modulator produces a sum and difference frequency signal on line 126 which is fed through a band pass filter 128. The filter selects the difference frequency to obtain a direct reference signal on line 130. Similarly, the output from oscillator 112 is applied by way of lines 116 and 132 to an integrator network 134 which shifts the phase of the oscillator output by 90°. The phase shifted signal is applied by way of line 136 to a modulator 138, which also receives by way of lines 122 and 140 the output from oscillator 114. The sum and difference frequencies appearing on modulator output line 142 are fed through a band pass filter 144 to select the difference frequency which appears on line 146 as a quadrature reference signal.

To obtain the variable phase modulator signal the output of the fixed oscillator is applied through lines 116 and 148 to a variable phase transducer network 150. the transducer network may be a conventional mechanically varied network driven, for example, by a motor drive 152 by way of motor shaft 154 to continuously vary the phase of the oscillator signal. The varying output from transducer 150 is applied by way of line 156 to a third modulator 158 where it is combined with the output from the variable frequency oscillator 114 by way of line 122. The sum and difference outputs from modulator 158 are applied to band pass filter 160 by way of line 162, where the difference signal is selected to obtain the variable phase modulation signal that appears on line 78 (FIG. 4).

By the use of a fixed frequency oscillator 112, the integrator 134 and the phase transducer 150 can produce precise phase angle shifts. The frequency of oscillator 112 can be relatively high so that the integrator and phase transducer may be of conventional construction. Oscillator 114 then also will be of relatively high frequency so that the difference frequency, and thus the reference and modulation signals, will be relatively low. Further, by making oscillator 114 variable, the reference and modulation frequencies can readily be changed.

The modulation frequency on line 78 is applied to the FM signal source 82 to modulate the frequency of a conventional carrier frequency generator. This modulated signal then drives the projector 54, which may be a conventional transducer device which converts the ultrasonic frequency electrical signals from source 82 to corresponding acoustic signals for transmission. The reflected signals which are returned from object 58 impinge on the faceplate of an image conversion tube used in camera 66, producing electrical charges in the tube which are interrogated on a point-by-point basis by means of a scanning electron beam. This beam couples the electrical charges to an output termination in the tube, as taught in the aformentioned U.S. Pat. Nos. 2,903,617 and 3,577,171 of William R. Turner, to produce the output video signal on line 88.

The video signal is applied to a conventional AM detector circuit 90, which detects the amplitude modulation of the video signal caused by the high level specular reflection characteristics and the lower level interference patterns between the diffuse reflections and the reradiation energy, as discussed with respect to FIG. 2.

Figure 6:
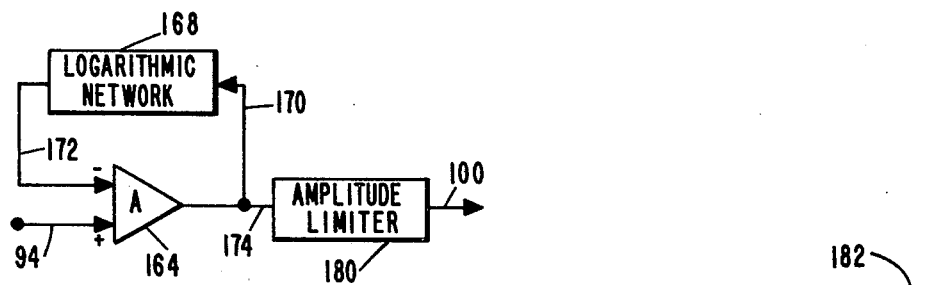
FIG. 6 is a detailed block diagram of a transfer control network usable in the system of FIG. 4.
Figure 7:
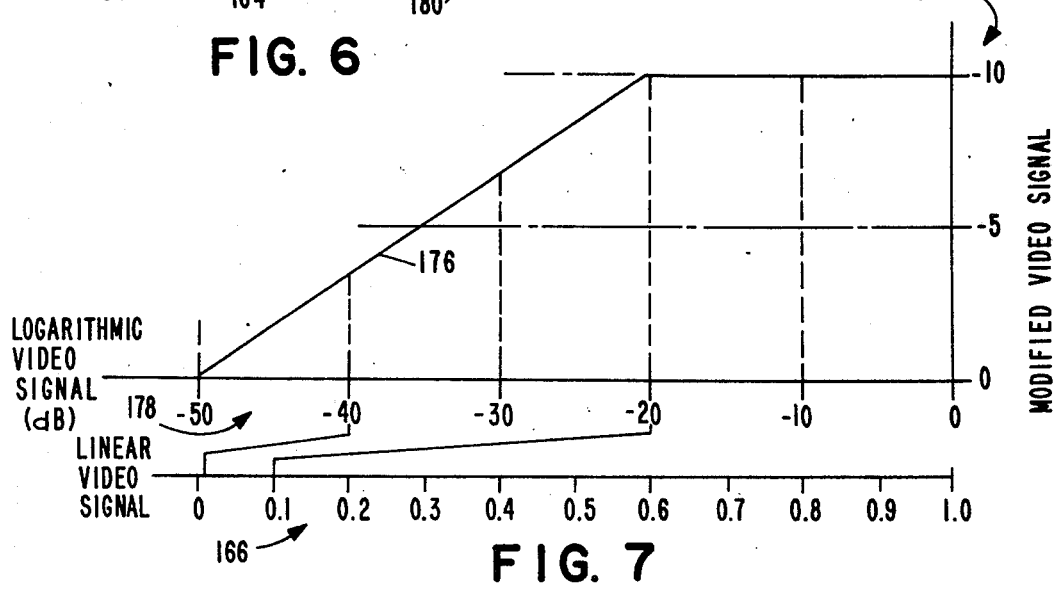
FIG. 7 is a graphical illustration of the function of the transfer control network of FIG. 6.

The detector output is a signal which varies linearly with the amplitude variations of the video signal on line 88, and this linear video signal is applied on line 94 to the transfer control circuit 98 illustrated in more detail in FIG. 6. This circuit serves to reduce extraneous amplitude fluctuations, and illustrates a preferred technique for accomplishing this purpose. The signal on line 94 is applied to the positive input of an operational amplifier 164; this linear video signal varies horizontally along the scale generally indicated at 166 in the graphical presentation of the transfer circuit in FIG. 7 and may, for example, vary between 0 and 1.0 amplitude units.

The output of amplifier 164 in FIG. 6 is fed back to the negative input of the amplifier through a logarithmic network 168 by way of lines 170 and 172, thereby converting the linear signal on line 94 to a logarithmic video signal on line 174. This transfer is represented in graphical form in FIG. 7 by the logarithmic transfer function 176, with the linear video signal of scale 166 being converted into a logarithmic video signal shown along horizontal scale 178. This compresses the wide range of the linear signal on line 94 to a narrow range on line 174.

The logarithmic video signal on line 174 (FIG. 6) is applied to an amplitude limiter 180 which clips any image spikes above a preset level, producing on line 100 a modified video signal for use in the display modulator to be described. The limiter can be set to clip the specular reflection spike 48, illustrated in FIG. 2, just above the level of reradiation and diffuse reflection, and this modified output signal is illustrated along the scale generally indicated at 182 in FIG. 7. The logarithmic conversion provided by the transfer network brings into the visualization process a wider dynamic range of scatter and reradiation than is characteristic of optical visualization, and reduces by the described compression step the influence of the received interference patterns. This signal, however, does not include depth of field information, but this is added by the processing steps described below.

Figure 8:
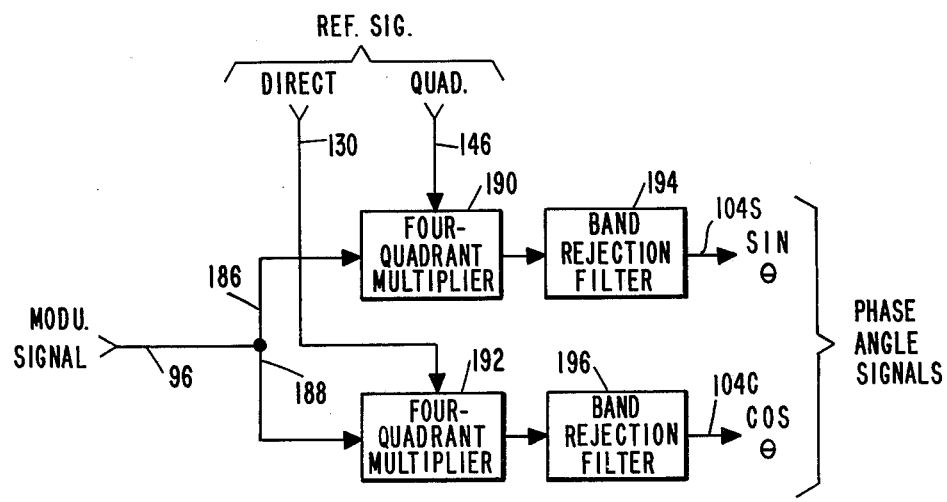
FIG. 8 is a detailed block diagram of a phase angle detector usable in the system of FIG. 4.

The video signal from the image camera 66 is applied by way of line 88 to the FM detector 92, which operates to isolate the frequency modulation in the return video signal. The FM signal on line 96 is compared to the reference signal on line 80, which comprises the direct and quadrature signals indicated in FIG. 5, by means of the phase angle detector circuit illustrated in FIG. 8, to which reference is now made.

The modulation signal on line 96, which is a constant amplitude reproduction of the original modulation signal except for phase shifts caused by the time delays of successive image points, is applied in parallel by way of lines 186 and 188 to two four-quadrant multipliers 190 and 192 which multiply the modulation signal by the quadrature reference signal on line 146 (from FIG. 5) and the direct reference signal on line 130 (from FIG. 5), respectively. The mathematical functions performed in the multipliers are as follows:

In multiplier 190, $$F(\theta) = \sin(\omega t + \theta) \times \sin(\omega t + \pi/2)$$
$$= \tfrac{1}{2}\sin(2\omega t + \theta) + \tfrac{1}{2}\sin\theta,$$

and in multiplier 192, $$F(\theta) = \sin(\omega t + \theta) \times \sin\omega t$$
$$= -\tfrac{1}{2}\cos(2\omega t + \theta) + \tfrac{1}{2}\cos\theta.$$

The double frequency components are removed by band rejection filters 194 and 196, respectively, providing the phase angle signal on line 104 (FIG. 4) in terms of its sine function on line 104s and its cosine function on line 104c. The combined sine and cosine functions are applied by way of line 104 to the display modulator 106, which may take one of two forms, as illustrated in FIGS. 9 and 10.

Figure 9:
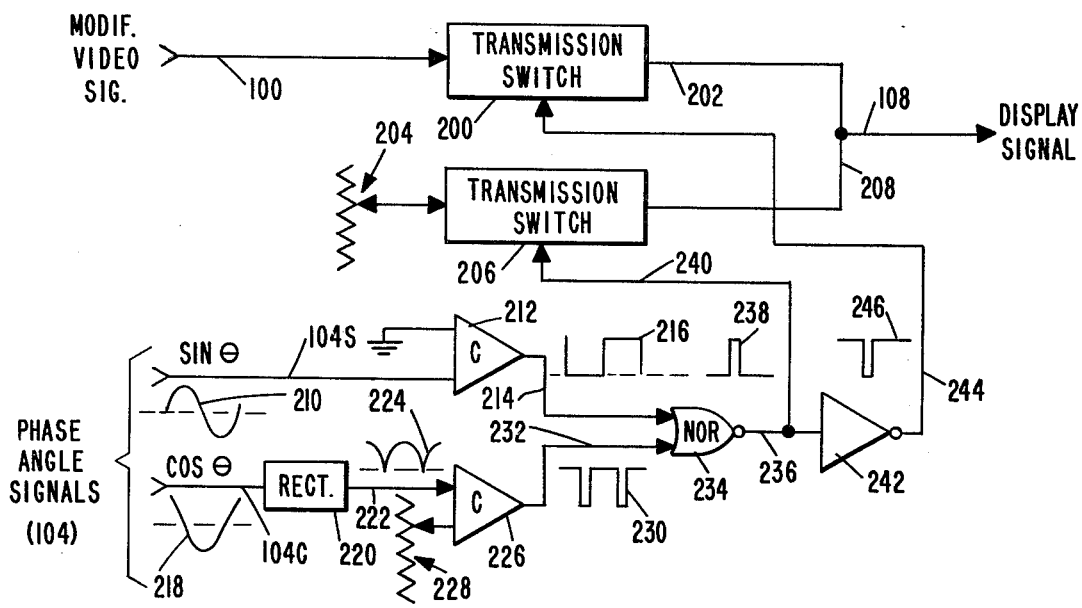
FIG. 9 is a detailed block diagram of a display modulator network usable in the system of FIG. 4.
Figure 10:
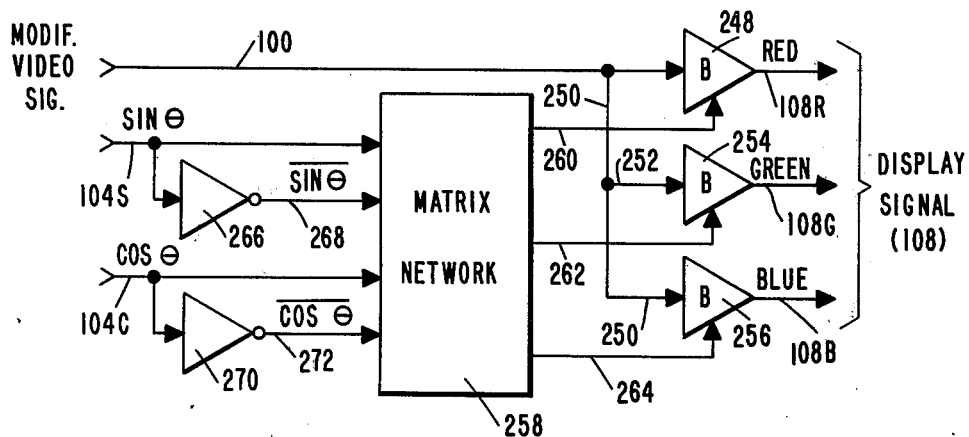
FIG. 10 is a detailed block diagram of a second display modulator network usable in the system of FIG. 4.

In the embodiment of FIG. 9, a display signal is produced on line 108 which is used to drive a black and white cathode ray display unit. This display signal incorporates depth of field information derived from the phase angle detection and generates on the cathode ray display unit a corresponding contour line which enables an observer to visualize the shape of the object. The display signal is produced, in FIG. 9, by application of the modified video signal from transfer control network 98 through line 100 to a transmission switch 200. This switch operates to connect the modified video signal to the display unit 110 by way of lines 202 and 108 except during the contour generation period, when the display signal is derived from a contour line level control, which comprises a potentiometer 204, through a second transmission switch 206 and line 208.

Transmission switches 200 and 206 are controlled by the phase angle signals produced on lines 104s and 104c by the phase angle detector network illustrated in FIG. 9. The sine function on line 104s, illustrated by waveform 210, is applied to one input of a voltage comparator 212, the other input of which is connected to ground. The comparator produces on line 214 a digital signal, illustrated by waveform 216, that is zero during the first half cycle of the input phase angle signal, and is unity during the second half cycle. The cosine function on line 104c, illustrated by waveform 218, is first applied to a rectifier 220, producing on line 222 a rectified function illustrated by waveform 224. This rectified function is applied to one input of a second voltage comparator 226, the second input of which is connected to a potentiometer 228 which is adjustable to set the level of input to which waveform 224 is compared. The output of the comparator is a digital signal illustrated by waveform 230 on line 232 which is unity except during an adjustable interval as the rectified function 224 approaches zero, and which is zero when the rectified function is zero.

Digital signals 216 and 230 on lines 214 and 232, respectively, are applied to a NOR gate 234, producing a brief transition from zero to unity on the gate output line 236 once during each phase angle cycle. This signal, represented by waveform 238, is applied by way of line 240 to control the operation of transmission switch 200, and is applied by way of inverter 242 and line 244 as inverted waveform 246 to transmission switch 200. The transmission switches 200 and 206 are thereby actuated, switch 200 being turned off and switch 206 being turned on during this interval to apply a contour line to the display. The display unit is synchronized with the image camera through the use of the common raster generator 84. The resulting contour line in the display occurs at the fixed phase angle of 90°. However, the phase angle as related to the depth of field ($\delta L$) by equation (5), that is, the phase angles ($\theta_b - \theta_p$) or ($\theta_a$ $-\theta_p$), can be varied by phase transducer 150 (FIG. 5) in the modulation source 76. This adds another time-related phase function to $\theta_p$. When the phase transducer is continuously varied by motor drive 152, the visual effect in the display is to continuously sweep a contour line over the object being visualized, thereby revealing its shape.

In a second embodiment of the display modulator 158, a display signal is generated on line 108 for application to a color display unit wherein depth of field information is incorporated as a change of color hue. The circuitry for producing the signals used to drive the color display is illustrated in FIG. 10, wherein the modified video signal is applied by way of line 100 (FIG. 4) to a first variable gain buffer 248 and by way of lines 250 and 252 to second and third variable gain buffers 254 and 256 in parallel with buffer 248. These three buffers produce on their output lines signals 108R, 108G, and 108B which constitute the display signal for the visual display unit 110. The signals on lines 108R, 108G and 108B provide the inputs to the red, green, and blue circuits, respectively, of the three-color cathode ray tube of unit 110. The variable gain buffers 248, 254 and 256 are controlled by signals from a conventional matrix network 258 in accordance with color television practice, with the control signals being applied by way of lines 260, 262, and 264 to the respective buffers.

The matrix network 258 receives and is controlled by the phase angle signal derived from phase angle detector 102, with the shine and the cosine signals being applied by way of lines 104s and 104c, respectively. In addition, the sine function on line 104s is applied by way of inverter 266 and line 268 to the matrix, and the cosine function on line 104c is applied by way of inverter 270 and line 272 to the matrix. The translation of the sine, cosine, inverse sine and inverse cosine signals through the matrix network 258 and the variable gain buffers 248, 254 and 256 produces in the color display unit a color hue that varies continuously with the phase angle function, thus revealing depth of field in the display image as a color modulation, superimposed on a brightness controlled by the modified video signal applied in parallel to each of the buffers.

Thus there has been provided a unique system for underwater visualization wherein an object can be identified with an acceptable level of recognition by means of a real time image. Image formation is obtained through the use of an ultrasonic lens which performs time delay and image point summing functions on a continuous analog basis, without sampling noise, and with a wide dynamic range. Detection of the image so formed is obtained through the use of a linear, electronically scanned image converter having a wide dynamic range, for which the sampling rate is limited only by processing circuit response, rather than by the actuation of a mechanical scanner. In the processing circuit, transfer control and phase angle detector networks provide high speed response since they do not require integration steps for summing and do not require time delays for the return of reflected pulses, and thus provide for real time image presentation. The visual image of the object to be visualized may be produced on a black and white or a color cathode ray tube, with the tube being driven by the processed display signals. In the case of a black and white display, the modified video signal produces variations in the brightness of the displayed image in accordance with the varying amplitude of the point-by-point sweep of the ultrasonic image, the image tube and the cathode ray tube being swept in synchronization. The depth information is produced by the contour input signal which occurs once each time the phase angle between the received phase-shifted modulation and the reference signal produces a transition signal in the processing networks, i.e., once during each phase angle cycle. The contour input to the cathode ray tube superimposes on the visual image a signal of predetermined intensity each time given depth (phase angle) signals are received, thereby tracing on the visual image contours of the given depths to assist in the visualization of the object. In the case of a color tube, the modified video signal is applied to the three color brightness control grids of the tube so that the election beam varies in brightness with the amplitude of the ultrasonic image received from the object and detected by the image tube. Superimposed on the signal to each brightness control grid is a modulation which is a function of the phase angle between the received ultrasonic signal and the reference signal, thereby varying the signals applied to the control grids to thereby change the color of the visual display. This occurs on a point-by-point basis as the ultrasonic image tube and the display tube are scanned in synchronism, so that the resulting color pattern provides a visual indication of the depth (i.e., phase angle) of the object. Although the present invention has been described in terms of preferred embodiments, it will be apparent to those of skill in the art that numerous variations and modifications will be possible without departing from the true spirit and scope of the invention, as described in the following claims.

What is claimed is:

1. A system for ultrasonic visualization of objects immersed in a transmission medium, comprising:
    an ultrasonic transmitter for radiating an ultrasonic beam through said transmission medium, said beam irradiating an object to be visualized;
    an ultrasonic image camera for converting ultrasonic images to corresponding electrical signals on a point-by-point basis;
    means focusing reflections from points on said object into said camera to form an ultrasonic image of said object, said camera producing a video signal which is a linear reproduction of the point-by-point interrogation of said image by said image camera;
    a first processing circuit responsive to said video signal for reducing non-image related fluctuations in the amplitude of said video signal;
    a second processing circuit responsive to said video signal for detecting relative time delays in said reflections from said object due to variations in depth dimensions of said object; and
    display means including a display modulator for combining the outputs of said first and second processing circuits to provide a display signal, and a visual display unit responsive to said display signal for presenting amplitude and depth dimension information in a visual form.

2. The system of claim 1, wherein said transmitter includes a source of frequency-modulated electrical signals and projector means for converting said frequency-modulated electrical signals to corresponding frequency-modulated acoustic signals for irradiating said object.

3. The system of claim 2, further including a modulation source, said modulation source producing a low frequency sinusoid of high spectral purity as a modulation signal for said source of frequency-modulated electrical signals, and producing a two-phase reference signal.

4. The system of claim 3, wherein said modulation source includes means for continuously varying the phase of said modulation signal with respect to said reference signal.

5. The system of claim 3, wherein said modulation source includes a first oscillator of fixed frequency and a second oscillator of variable frequency;
  means for obtaining a direct reference signal which is the difference frequency between said fixed and variable frequency oscillators; and
  means for obtaining a quadrature reference signal which is the difference frequency between said variable frequency oscillator and the output of said fixed frequency oscillator shifted in phase by 90°, said direct and quadrature signals comprising said two-phase reference signal.

6. The system of claim 5, wherein said modulation source further includes means for continuously varying the phase of said modulation signal with respect to said reference signal.

7. The system of claim 5, wherein said modulation source further includes means for obtaining a variable phase modulation frequency which is the difference frequency between said variable frequency oscillator and the output of said fixed frequency oscillator variably and continuously shifted.

8. The system of claim 4, wherein said first processing circuit comprises an amplitude modulation detector for producing a linear video signal which is a direct reproduction of the video signal envelope from said image camera.

9. The system of claim 8, wherein said first processing circuit further includes a transfer control network responsive to said linear video signal to provide a logarithmic conversion of and a limiting of said linear video signal to produce a modified video signal for visualization of said object.

10. The system of claim 4, wherein said second processing circuit comprises a frequency modulation detector for detecting the frequency deviation of said video signal, thereby to reproduce a phase-shifted version of said modulation signal, the shifts in phase of said reproduced signal being in accordance with the time delays of corresponding ultrasonic reflections from points on said object.

11. The system of claim 10, wherein said second processing circuit further includes a phase angle detector responsive to said reproduced phase-shifted version of said modulation signal and to said two-phase reference from said modulation source to produce a phase angle signal for application to said display modulator to provide a depth dimension to the visual display of said object.

12. The system of claim 11, wherein said phase angle detector comprises first and second multiplier means for multiplying said reproduced phase-shifted version of said modulation signal by one phase of said reference and by the second phase of said reference, respectively, whereby said reproduced phase-shifted version of said modulated signal is converted into sine and cosine functions of the phase angle between said reference and said phase-shifted version of said modulated signal.

13. The system of claim 12, wherein said first processing circuit comprises an amplitude modulation detector for producing a linear video signal.

14. The system of claim 13, wherein said first processing circuit further includes a transfer control network responsive to said linear video signal, said transfer control network producing a modified video signal.

15. The system of claim 14, wherein said display modulator is responsive to said modified video signal and to said sine and cosine functions to produce said display signal, said display signal driving said display unit.

16. The system of claim 14, wherein said display modulator includes input means for receiving said modified video signal, contour line level control means, an output line, and selectively operable switch means for connecting said input means or said contour line level control means to said output line to produce said display signal on said output line for driving said display unit.

17. The system of claim 16, wherein said display modulator further includes first and second voltage comparator means responsive to said sine and cosine functions, respectively, to produce digital signals corresponding to said functions, and gate means responsive to said digital signals for producing a transition signal once each phase angle cycle, said switch means being responsive to said transition signal to connect said contour line level control means to said output line for the duration of said transition signal.

18. The system of claim 17, wherein said display unit is a black and white cathode ray display producing an image which varies in brightness with said modified video signal, and which incorporates depth of field information as a contour line to reveal the shape of said object.

19. The system of claim 14, wherein said display modulator includes first, second, and third variable gain buffer means for receiving in parallel said modified video signal, means responsive to said sine and cosine functions for adjusting the gain of said buffers, to produce said display signal, and means connecting the output display signal from said buffers to said display unit.

20. The system of claim 19, wherein said display unit is a color cathode ray display, said first, second and third buffers producing red, green and blue control signals for said color display to produce a color line that varies continuously with the phase angle function to reveal depth of field in the display image as a color modulation of the image brightness which is controlled by the modified video signal.

* * * * *